(12) United States Patent
Ma

(10) Patent No.: US 12,317,009 B2
(45) Date of Patent: *May 27, 2025

(54) SYSTEM AND METHOD FOR GUIDING EYEBROW SHAPING WITH PROJECTED LIGHT

(71) Applicant: Fleek Inc., Dover, DE (US)

(72) Inventor: Xiao Qing Ma, Dover, DE (US)

(73) Assignee: Fleek Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,239

(22) Filed: Jan. 31, 2024

(65) Prior Publication Data
US 2024/0171715 A1 May 23, 2024

Related U.S. Application Data

(63) Continuation of application No. 18/199,853, filed on May 19, 2023, now Pat. No. 11,924,588.
(Continued)

(51) Int. Cl.
G06T 11/00 (2006.01)
A45D 44/00 (2006.01)
(Continued)

(52) U.S. Cl.
CPC ......... *H04N 9/3185* (2013.01); *A45D 44/005* (2013.01); *G06T 7/13* (2017.01);
(Continued)

(58) Field of Classification Search
CPC .. H04N 9/3185; H04N 9/3164; A45D 44/005; A45D 2044/007; G06T 7/13; G06T 7/60; G06T 7/74; G06T 19/20; G06T 2200/24; G06T 2207/20092; G06T 2207/30201; G06T 2207/30204; G06T 2219/004; G06T 2219/2021; G06V 40/165; G06V 40/171

See application file for complete search history.

(56) References Cited

U.S. PATENT DOCUMENTS 5,028,121 A * 7/1991 Baur .................... H04N 9/3167
349/194
10,217,264 B2 * 2/2019 Vaganov ............. G06F 3/03545
(Continued)

Primary Examiner — Howard D Brown, Jr.
(74) Attorney, Agent, or Firm — Run8 Patent Group, LLC; Peter Miller

(57) ABSTRACT

A method includes: accessing a canvas image including; a target left eyebrow geometry arranged on a left side of a facial centerline and including a first set of curvilinear segments; and a target right eyebrow geometry arranged on a right side of the facial centerline opposite the left target left eyebrow geometry and including a second set of curvilinear segments. The method also includes, during an annotation period: via a projection system, projecting the canvas image onto a user's face; centering the facial centerline of the canvas image on the user's face; locating the first set of curvilinear segments of the target left eyebrow geometry, projected onto the user's face, relative to features of the left eyebrow of the user; and mirroring the second set of curvilinear segments of the target right eyebrow geometry, projected onto the user's face, across the vertical face centerline.

20 Claims, 5 Drawing Sheets

Related U.S. Application Data

(60) Provisional application No. 63/343,738, filed on May 19, 2022.

(51) Int. Cl.
  *G06T 7/13* (2017.01)
  *G06T 7/60* (2017.01)
  *G06T 7/73* (2017.01)
  *G06T 19/20* (2011.01)
  *G06V 40/16* (2022.01)
  *H04N 9/31* (2006.01)

(52) U.S. Cl.
  CPC .................. *G06T 7/60* (2013.01); *G06T 7/74* (2017.01); *G06T 19/20* (2013.01); *G06V 40/165* (2022.01); *G06V 40/171* (2022.01); *H04N 9/3164* (2013.01); *A45D 2044/007* (2013.01); *G06T 2200/24* (2013.01); *G06T 2207/20092* (2013.01); *G06T 2207/30201* (2013.01); *G06T 2207/30204* (2013.01); *G06T 2219/004* (2013.01); *G06T 2219/2021* (2013.01)

(56) References Cited

U.S. PATENT DOCUMENTS

| | | | | |
|---|---|---|---|---|
| 2011/0292042 | A1* | 12/2011 | Vaganov | B44D 2/002 345/419 |
| 2013/0120425 | A1* | 5/2013 | Kuwabara | G06T 15/04 345/582 |
| 2013/0222385 | A1* | 8/2013 | Dorsey | G06T 15/005 345/427 |
| 2014/0292749 | A1* | 10/2014 | Vaganov | H04N 13/30 345/419 |
| 2015/0015699 | A1* | 1/2015 | Vieth | H04N 9/3185 348/135 |
| 2015/0015732 | A1* | 1/2015 | Vieth | H04N 5/74 348/222.1 |
| 2022/0101651 | A1* | 3/2022 | Tanifuji | G06V 40/171 |
| 2022/0215507 | A1* | 7/2022 | Ye | G06T 3/14 |

* cited by examiner

SYSTEM AND METHOD FOR GUIDING EYEBROW SHAPING WITH PROJECTED LIGHT

CROSS-REFERENCE TO RELATED APPLICATIONS

This application is a continuation application of U.S. patent application Ser. No. 18/199,853, filed on 19 May 2023, which claims the benefit of U.S. Provisional Application 63/343,738, filed on 19 May 2022, each of which is incorporated in its entirety by this reference.

TECHNICAL FIELD

This invention relates generally to the field of light projection systems and more specifically to a new and useful system and method for guiding eyebrow shaping with projected light in the field of light projection systems.

DESCRIPTION OF THE EMBODIMENTS

Figure 1A:
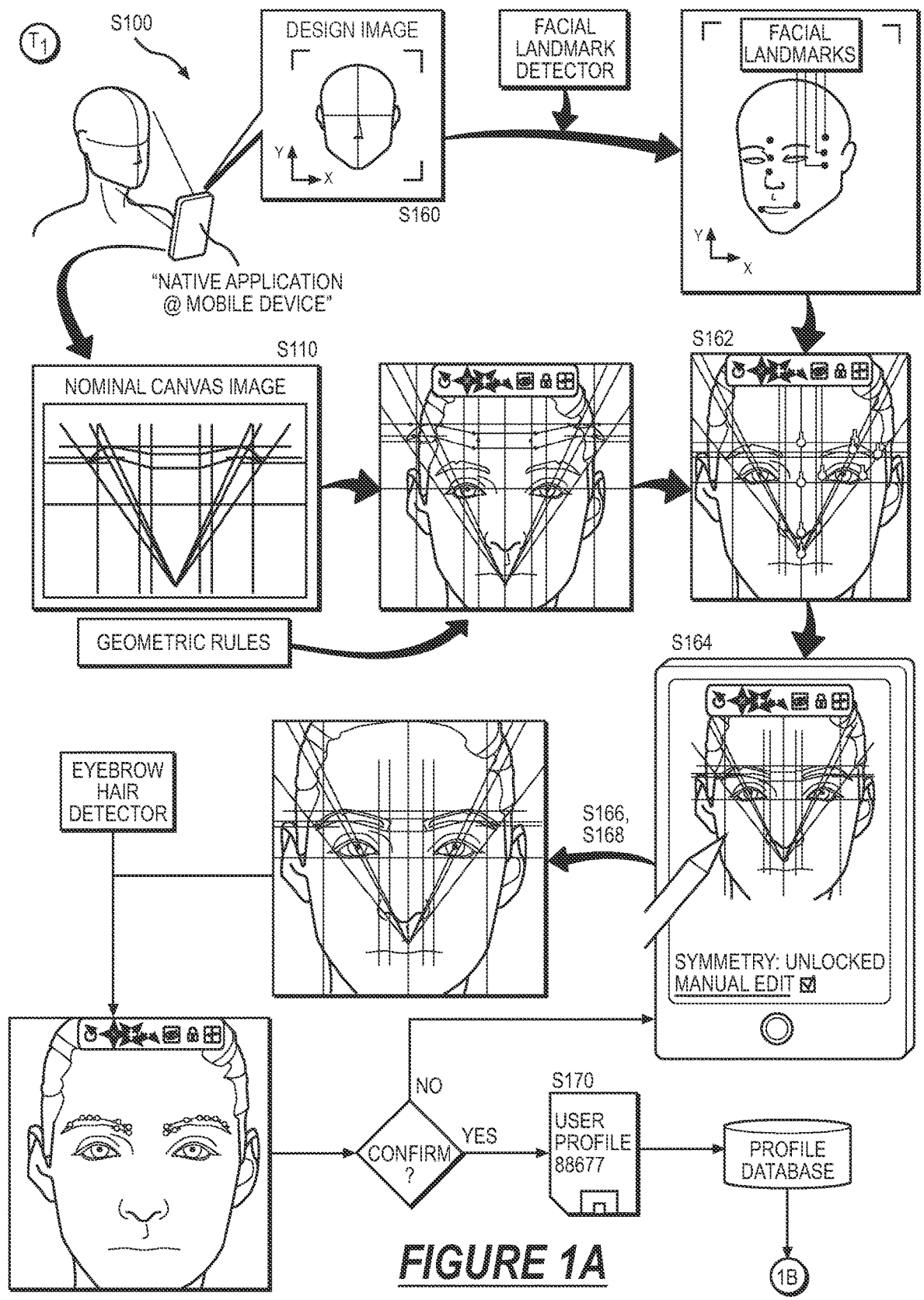
FIGS. 1A and 1B are a flowchart representation of a method.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method: Defect Detection and Repair Followed by Processing

As shown in FIGS. 1A, 1B, 2A, 2B, and 2C, a method S100 for guiding eyebrow shaping includes accessing a canvas image—including a vertical face centerline, a target first eyebrow geometry, and a target second eyebrow geometry—in Block S110. The target first eyebrow geometry: is arranged on a first side of the vertical face centerline; and includes a first set of curvilinear segments geometrically referenced to the vertical face centerline. The target second eyebrow geometry: is arranged on a second side of the vertical face centerline opposite the first target first eyebrow geometry; and includes a second set of curvilinear segments geometrically referenced to the vertical face centerline and the first set of curvilinear segments.

The method S100 also includes, during an annotation period: via a projection system, projecting the canvas image onto a face of a user located on a headrest facing the projection system in Block S140; aligning the vertical face centerline of the canvas image to a center of the face of the user in Block S130; locating curvilinear segments, in the first set of curvilinear segments of the target first eyebrow geometry in the canvas image, relative to features of the first eyebrow of the user in Block S130; and mirroring curvilinear segments, in the second set of curvilinear segments of the target second eyebrow geometry in the canvas image projected onto the face of the user, across the vertical face centerline in Block S132.

1.1 Method: Confirmation+Alignment Markers

In one variation of the method S100 shown in FIGS. 1A, 1B, 2A, 2B, and 2C, the target first eyebrow geometry: is arranged on a first side of the vertical face centerline; and includes a first set of curvilinear segments geometrically referenced to the vertical face centerline. The target second eyebrow geometry: is arranged on a second side of the vertical face centerline opposite the first target first eyebrow geometry; and includes a second set of curvilinear segments geometrically referenced to the vertical face centerline and the first set of curvilinear segments.

This variation of the method S100 includes, during the annotation period: via a projection system, projecting the canvas image onto a face of a user located on a headrest coupled to the projection system in Block S140; aligning the vertical face centerline of the canvas image—projected onto the face of the user—to a center of the face of the user in Block S130; locating curvilinear segments, in the first set of curvilinear segments of the target first eyebrow geometry in the canvas image projected onto the face of the user, relative to features of the first eyebrow of the user in Block S130; and mirroring curvilinear segments, in the second set of curvilinear segments of the target second eyebrow geometry in the canvas image projected onto the face of the user, across the vertical face centerline in Block S132.

This variation of the method S100 also includes, in response to receiving confirmation of the target first eyebrow geometry and the target second eyebrow geometry, in the canvas image projected onto the face of the user: projecting a set of alignment markers, adjacent the canvas image, onto the face of the user in Block S150; generating a prompt to temporarily apply a set of marks coincident the set of alignment markers on the face of the user and to trace outlines of the target first eyebrow geometry and the target second eyebrow geometry onto the face of the user while maintaining the set of marks coincident the set of alignment markers in Block S152; and serving the prompt to an operator proximal the user in Block S154.

1.2 Method: Facial Landmark Detection+Auto-Alignment

Figure 1B:
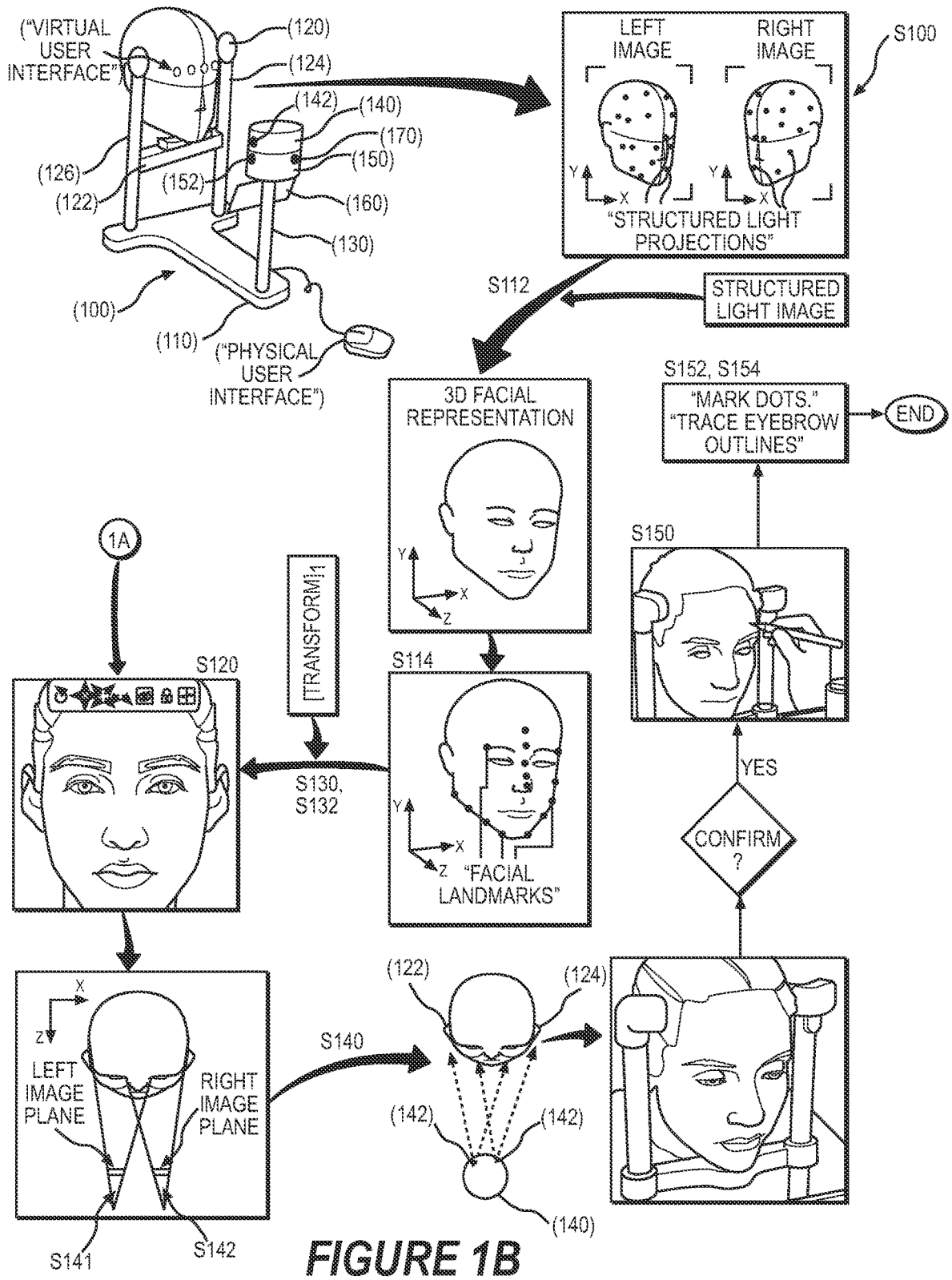

In one variation of the method S100 shown in FIGS. 1A and 1B, the target first eyebrow geometry: is arranged on a first side of a vertical face centerline; and includes a first set of curvilinear segments geometrically referenced to a set of facial landmarks. The target second eyebrow geometry: is arranged on a second side of the vertical face centerline opposite the first target first eyebrow geometry; and includes a second set of curvilinear segments geometrically referenced to the set of facial landmarks.

This variation of the method S100 includes, during the annotation period: accessing a set of images captured via a left optical sensor and a right optical sensor facing a face of a user located on a headrest in Block S110; compiling the set of images into a three-dimensional facial representation of the face of the user in Block S112; detecting the set of facial landmarks in the three-dimensional facial representation in Block S114; and virtually projecting the canvas image, aligned to facial landmarks in the set of facial landmarks, onto the three-dimensional facial representation in Block S120; generating a left canvas image in Block S141 based on projection of the canvas image from the three-dimensional facial representation onto a stored field of view of a left light projector adjacent the left optical sensor; generating a right canvas image in Block S142 based on projection of the canvas image from the three-dimensional facial representation onto a stored field of view of a right light projector adjacent the right optical sensor; projecting the left canvas image onto the face of the user via the left light projector in Block S140; and projecting the right canvas image onto the face of the user via the right light projector in Block S140.

2. Applications

Generally Blocks of the method S100 can be executed by a facial projection system (hereinafter the "system") to project new target eyebrow geometries onto a user's face, such as in white or otherwise visible light, thereby: enabling the user to visually perceive these new target eyebrow geometries on her own face before committing to these new target eyebrow geometries; and enabling an operator (e.g., an aesthetician) to trace these projected target eyebrow geometries on the user's face once confirmed by the user and before microblading, applying ombre, nanostroking, tattooing, tinting, waxing, tweezing, threading, transplanting, or otherwise augmenting or modifying the user's eyebrows within these traced boundaries. In particular, the system 100 can include: a headrest configured to support the user's head; projection system including one or a set of light projectors facing the headrest; and a mirror adjacent the projection system and facing the headrest. Accordingly, the system 100 can: interface with the operator to define the new target eyebrow geometries, such as based on the user's preferred eyebrow, a combination of aesthetic qualities of both eyebrows preferred by the user, or other eyebrow preferences of the user (e.g., thicker, thinner, wider, flatter eyebrows); project the new target eyebrow geometries onto the user's face; and then update these new target eyebrow geometries—projected onto the user's face—based on further inputs from the operator, such as responsive to feedback from the user viewing these projected eyebrow geometries through the mirror.

Therefore, the system 100 can execute Blocks of the method S100 to enable the operator and the user: to design new eyebrow geometries for the user; and to visualize these new eyebrow geometries in real-time on the user's face. The system 100 can further execute Blocks of the method S100 to enable the operator to quickly trace the new eyebrow geometries confirmed by the user before microblading, applying ombre, nanostroking, tattooing, tinting, waxing, tweezing, threading, transplanting, or otherwise augmenting or modifying the user's existing eyebrows.

In one implementation, the system 100 can execute Blocks of the method S100: to access a canvas image defining a vectorized map of facial references (e.g., a vertical face centerline, horizontal eye line, left and right vertical inner eye lines) and human eyebrow geometries (e.g., vertices interposed between a set of arc segments) geometrically linked to these facial references; to project this canvas image onto a face of a user—located on a headrest—via a projection system facing the headrest; to adjust the human eyebrow geometries in the canvas image while projected on the user's face based on manual adjustments entered by an operator; and to then project a set of alignment markers on the users face adjacent the canvas image once the operator confirms eyebrow geometries represented in the canvas image. The operator may then: mark the alignment markers on the user's face, such as with a temporary makeup pen; and trace the human eyebrow geometries—in the canvas image projected on the user's face—on the user's face, such as with the temporary makeup pen, while maintaining alignment between the temporary marks on the user's face and the alignment markers projected on the user's face. Upon disabling the system 100 or moving the user away from the system 100; the operator may then microblading, applying ombre, nanostroking, tattooing, tinting, waxing, tweezing, threading, transplanting, or otherwise augmenting or modifying the user's eyebrows within these traced boundaries.

Additionally or alternatively, the system 100 can include an integrated imaging system, such as including one or a pair of color cameras. Accordingly, the system 100 can execute Blocks of the method S100 to: capture an image (e.g., a two-dimensional photographic image, a three-dimensional composite image or depth map) of the user via the imaging system; automatically detect facial landmarks in this image; automatically align facial references in the canvas image to corresponding facial landmarks (e.g., by aligning the centering the vertical face centerline on the user's face, aligning the horizontal eye line to the user's pupils, locating the left and right vertical inner eye lines on the user's left and right caruncles); automatically adjust the eyebrow geometries in the canvas image according to predefined geometric links to these facial references; and project this canvas image—thus modified according to facial landmarks detected in the image of the user—onto the user's face. Therefore, in this implementation, the system 100 can: autonomously adjust the canvas image based on facial landmarks on the user's face, thereby defining an initial target eyebrow geometry onto the user's face. The system 100 can then interface with the operator to modify this initial target eyebrow geometry according to feedback from the user.

Additionally or alternatively, an application executing on the user's mobile device (e.g., smartphone, tablet) can interface with the user to generate the new target eyebrow geometry prior to the annotation period (e.g., before the user arrives at a salon or meets with the operator). In particular, the application can execute Blocks of the method S100 to: capture an image (e.g., a two-dimensional photographic image) of the user's face; project the canvas image onto this image depicting the user's face; render this image—augmented with the canvas image—on a display of the mobile device; and implement the foregoing methods and techniques to adjust positions of facial references and/or the target eyebrow geometries defined in the canvas image, such as based on manual inputs from the user or based on positions of facial landmarks automatically detected in the image by the application. Once confirmed by the user, the application can store the final target eyebrow geometry set by the user, such as in a user profile associated with the user and stored in a remote database. Later, once the user arrives at the system 100 (e.g., arrives at a salon and places her head on the headrest of the system 100), the system 100 can: access the user's profile; load the canvas image from the user's profile; capture an image (e.g., a two-dimensional photographic image, a three-dimensional depth map) of the user's face; detect facial landmarks in this image; align the canvas image to these facial landmarks; project the canvas image onto the user's face; and then interface with the operator to further adjust the canvas image according to feedback from the user.

The method S100 is described herein as executed by the system 100 to project target eyebrow geometries—that differ from one or both of the user's eyebrows—onto the user's face in preparation for augmentation or modification of the user's eyebrows, such as via microblading, applying ombre, nanostroking, tattooing, or tinting. However, the method S100 can additionally or alternatively be executed by the system 100 to project new target geometries of other facial features onto the user's face in preparation for augmentation or modification. For example, the system 100 can implement similar methods and techniques to: project target lip geometries on the user's face in preparation for lip blushing; project target beard geometries on the user's face in preparation for beard styling; project target bang geometries on the user's face in preparation for hair styling or bang trimming; project target hairline geometries on the user's face in preparation for scalp micropigmentation, hair transplant, or lineups (e.g., at a barber shop); project eyeliner geometries on the user's face in preparation for application of eyeliner; and/or project target freckle constellations on the user's face in preparation for freckle augmentation; etc.

3. System

Generally and as shown in FIG. 1A, the system 100 includes: a base 110; a headrest 120; an optics support 130; an imaging system 140; a projection system 150; a mirror; and/or a controller 170.

The imaging system 140: is arranged on the optics support 130; and includes a set of optical sensors 142, such as one or a pair of laterally-offset color cameras (e.g., left and right cameras).

The projection system 150: is arranged on the optics support 130; and includes a one or a pair of laterally-offset light projectors 152.

The mirror 160 is arranged on the optics support 130 adjacent projection system 150 and faces the headrest 120.

The controller 170 is configured to execute Blocks of the method S100.

3.1 Structure

The base 110: can be configured to rest on a horizontal table surface; or include a table clamp configured to locate over and clamp against an edge of a horizontal surface.

The headrest 120 is supported on the base 110 and includes: a chin support 122; a left temple support 124 (e.g., a vertical padded column) extending upwardly from a left side of the chin support 122; and a right temple support 126 extending upwardly from a right side of the chin support 122.

The optics support 130 is supported on the base 110 or extends longitudinally from the headrest 120.

In one implementation, the base 110 includes an injection-molded plastic structure defining a pair of front column receptacles and a rear column receptacle. The headrest 120 can include a pair of front columns configured to insert into the front column receptacles. The chin support 122 can: seat over and extend between the pair of front columns; and define a rigid or compliant (e.g., foam-backed) concave surface configured to receive and support a user's chin. The left and right temple supports, 124, 126 can: extend upwardly above and can be laterally offset from the chin support 122; and define rigid or compliant projections configured to rest against the user's head, such as near the user's temples. The chin and temple supports can therefore cooperate to constrain the user's head over the base no.

In this implementation, the optics support 130 can: include a third column configured to insert into the rear column receptacle; and define an easel or shelf configured to locate the mirror 160 above the base no, such as at a height above the base no and similar to a height of the chin support 122 above the base 110.

Furthermore, the imaging system 140, the projection system 150, and the controller 170 can occupy a common electronics housing arranged on the optics support 130 and facing the headrest 120. For example, the common electronics housing can be arranged on the optics support 130 above the base no and the mirror 160 with fields of view of the optical sensor 142(s) and the light projector 152(s) in the imaging and projection systems 150 facing the headrest 120.

3.2 Imaging+Projection Systems

In one implementation, the system 100 includes a left color camera: arranged near a left side of common electronics housing; defining a field of view biased toward the left temple support 124; and therefore configured to capture images depicting the front of the user's face and a portion of a left side of the user's head, such as the user's left temple, left cheek, and left jaw line. In this implementation, the system 100 can also include a left light projector 152: defining a field of view (predominantly) intersecting the field of view of the left color camera. Therefore, the system 100 can project images (e.g., structured light, eyebrow geometries) onto the left side of the user's face to both enable the system 100 to capture three-dimensional data representing the left side of the user's face via the left color camera during a setup cycle and to visually annotate the left side of the user's face (e.g., the user's left brow) with light-based markers (hereinafter the "canvas image").

In this implementation, the system 100 can similarly include a right color camera: arranged near a right side of common electronics housing; defining a field of view biased toward the right temple support 126; and therefore configured to capture image depicting the front of the user's face and a portion of a right side of the user's head, such as the user's right temple, right cheek, and right jaw line. In this implementation, the system 100 can also include a right light projector 152: defining a field of view (predominantly) intersecting the field of view of right color camera. Therefore, the system 100 can project images onto the right side of the user's face to both enable the system 100 to capture three-dimensional data representing the right side of the user's face via the right color camera during a setup cycle and to visually annotate the right side of the user's face (e.g., the user's right brow) with the canvas image.

In this implementation, during a setup cycle prior to an annotation period: the left light projector 152 can project a first sequence of structured light features onto (predominately) the left side of the user's face; the left color camera can capture a first sequence of images (predominately) depicting the left side of the user's face; the right light projector 152 can project a second sequence of structured light features onto (predominately) the right side of the user's face; and the right color camera can capture a second sequence of images (predominately) depicting the right side of the user's face. The system 100 can then implement structured light techniques to derive a three-dimensional representation of the left and right sides of the user's face based on these sequences of structured light features, these images, and known offsets between and/or characteristics of the fields of view of the left and right color cameras and the left and right light projectors 152. Later, during the annotation period: the left light projector 152 can project a left half of the canvas image onto the left side of the user's face; and the right light projector 152 can project the right half of the canvas image onto the right side of the user's face.

Alternatively, the imaging system 140 can include a single optical sensor 142 (e.g., a color camera, a depth sensor) defining a field of view facing and centered on the headrest 120; and the projection system 150 can include a single light projector 152 defining a field of view similarly facing and centered on the headrest 120. In this implementation, during a setup cycle prior to an annotation period: the light projector 152 can project a first sequence of structured light features onto the user's face; and the optical sensor 142 can capture a sequence of images depicting the user's face illuminated with structured light. The system 100 can then implement structured light techniques to derive a three-dimensional representation of the user's face based on these images and known offsets between and/or characteristics of the fields of view of the optical sensor 142 and the light projector 152.

Thus, in the foregoing implementations, the system 100 can construct a two-dimensional or three-dimensional facial representation of the user's face based on images captured by the imaging system 140 and/or structured light projected onto the user's face by the projection system 150. The system 100 can then automatically align a canvas image and/or relocate facial references in the canvas image based on facial landmarks detected in the facial representation, thereby reducing setup or initial adjustment time for the operator.

Yet alternatively, the system 100 can include a single light projector 152 and exclude an imaging system 140. Accordingly, the system 100 can interface with the operator to manually align the canvas image and/or relocate facial references in the canvas image—projected on the user's face—to the user's facial features.

3.3 Controller+User Interface

In one implementation, the system 100 further includes a user interface, such as including a set of input buttons, a trackpad, or a touch screen arranged on the common electronics housing.

Additionally or alternatively, the system 100 can include or interface with an external physical user interface, such as a wired or wireless mouse or trackpad.

3.3.1 Virtual Interface

In one implementation shown in FIGS. 1B and 2A, in addition to or in place of a physical user interface, the projection system 150 is configured to project a virtual user interface—such as including a set of virtual graphics or icons—onto the user's face (e.g., the user's forehead) or onto an adjacent projection surface of the system 100 (e.g., below the chin support 122) during operation. In this implementation, the imaging system 140 captures images of the user and/or the projection surface during operation. The controller 170: scans these images for presence of a human finger, stylus, or other object intersecting a virtual icon in the virtual user interface projected onto the user or the projection surface; and registers an input to the system 100 in response to detecting such presence of a human finger, stylus, or other object intersecting a corresponding virtual icon in the virtual user interface.

Therefore, in this implementation, the projection system 150 can: project structured light onto the user to enable the system 100 to capture three-dimensional data representation the user's facial morphology during a setup cycle; project the canvas image onto the user's face during an annotation period; and project a virtual user interface elsewhere on the user's face and/or an adjacent projection surface of the system 100 to enable the operator to control the system 100 without directing her attention from the user, without interfacing with another device, and without touching the common electronics housing, which may otherwise disturb alignment between the projection system 150 and the user's face.

4. Manual Operation+Real-Time Eyebrow Design

Figure 2A:
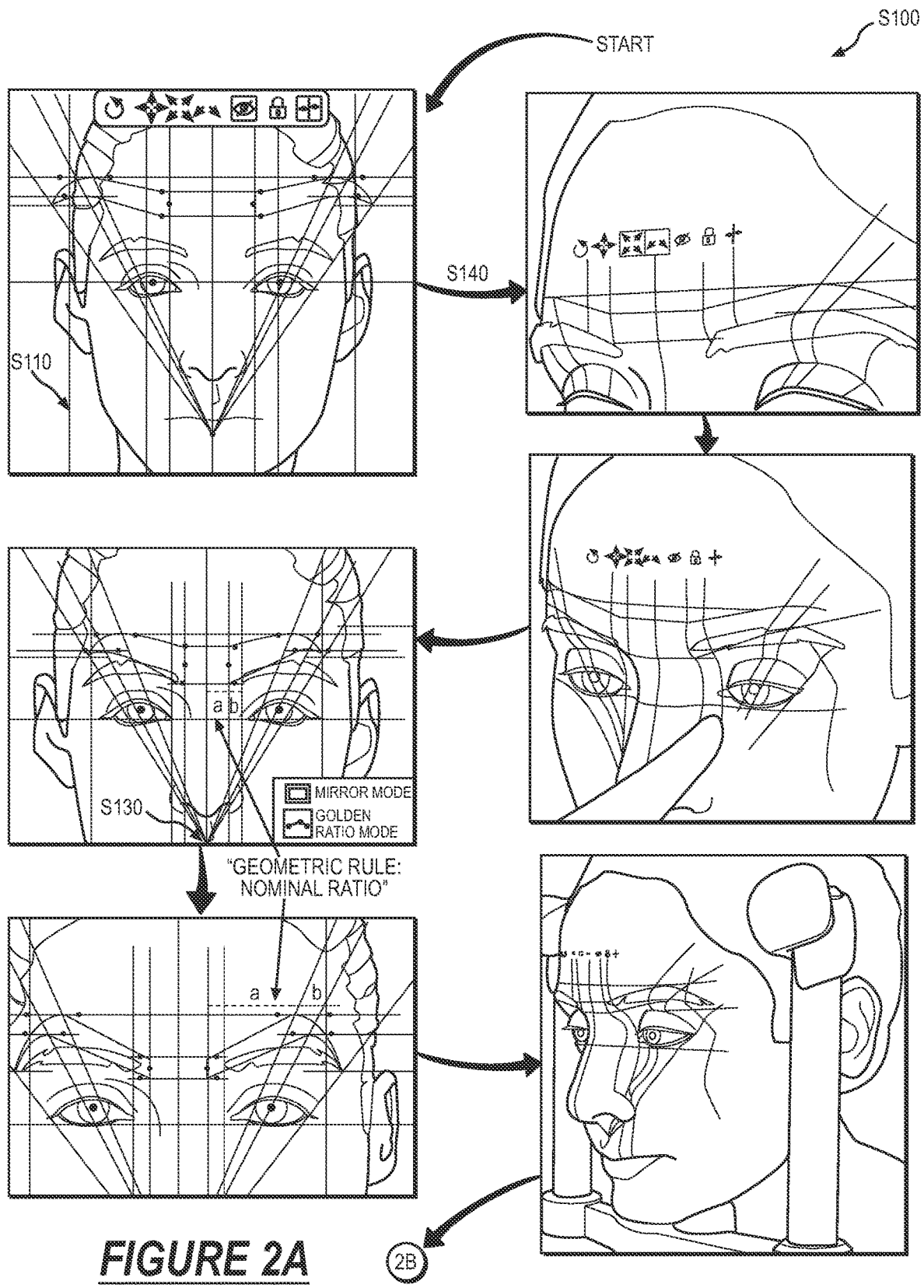
FIGS. 2A, 2B, 2C, are a flowchart representation of a method.
Figure 2B:
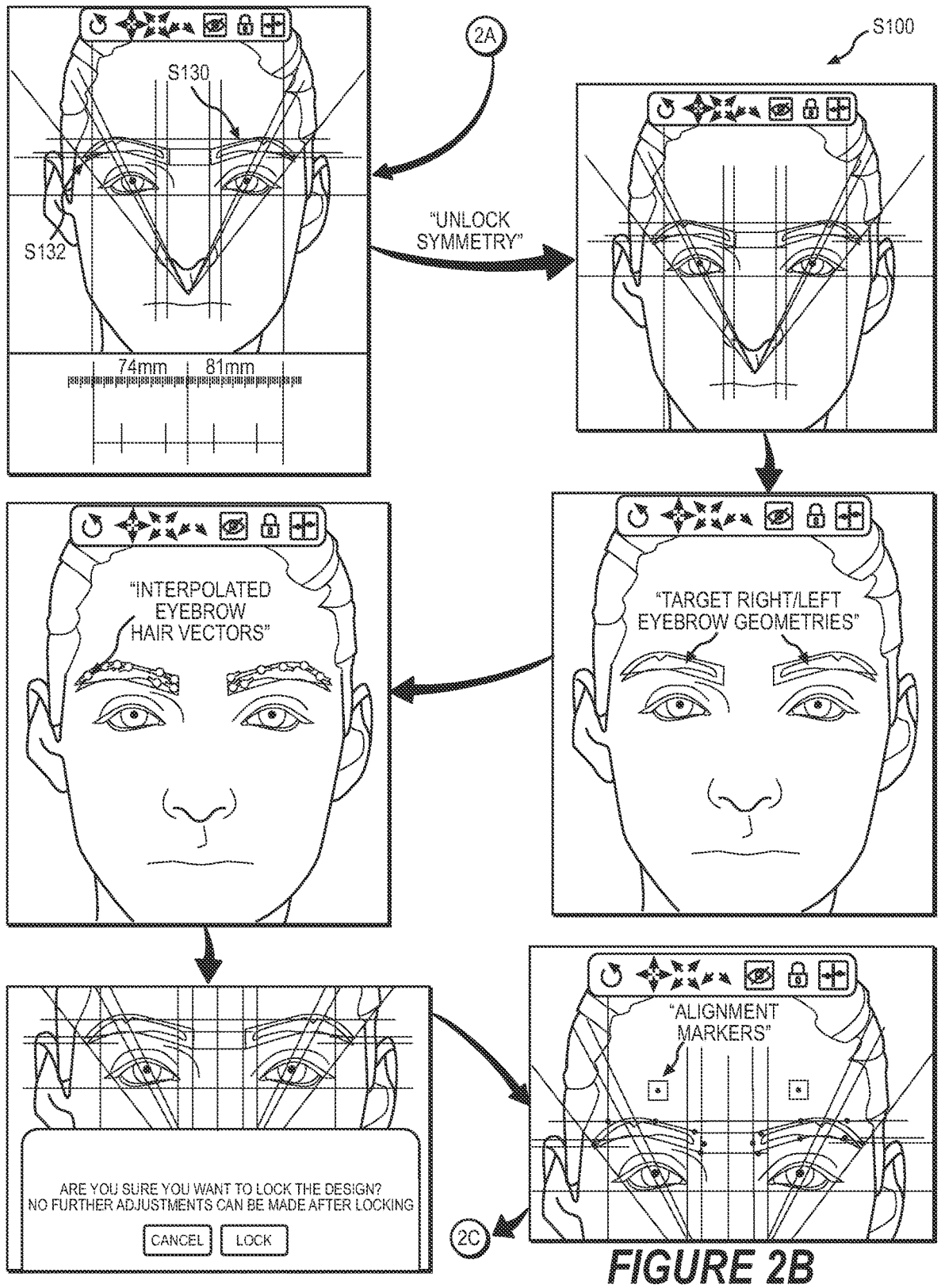
Figure 2C:
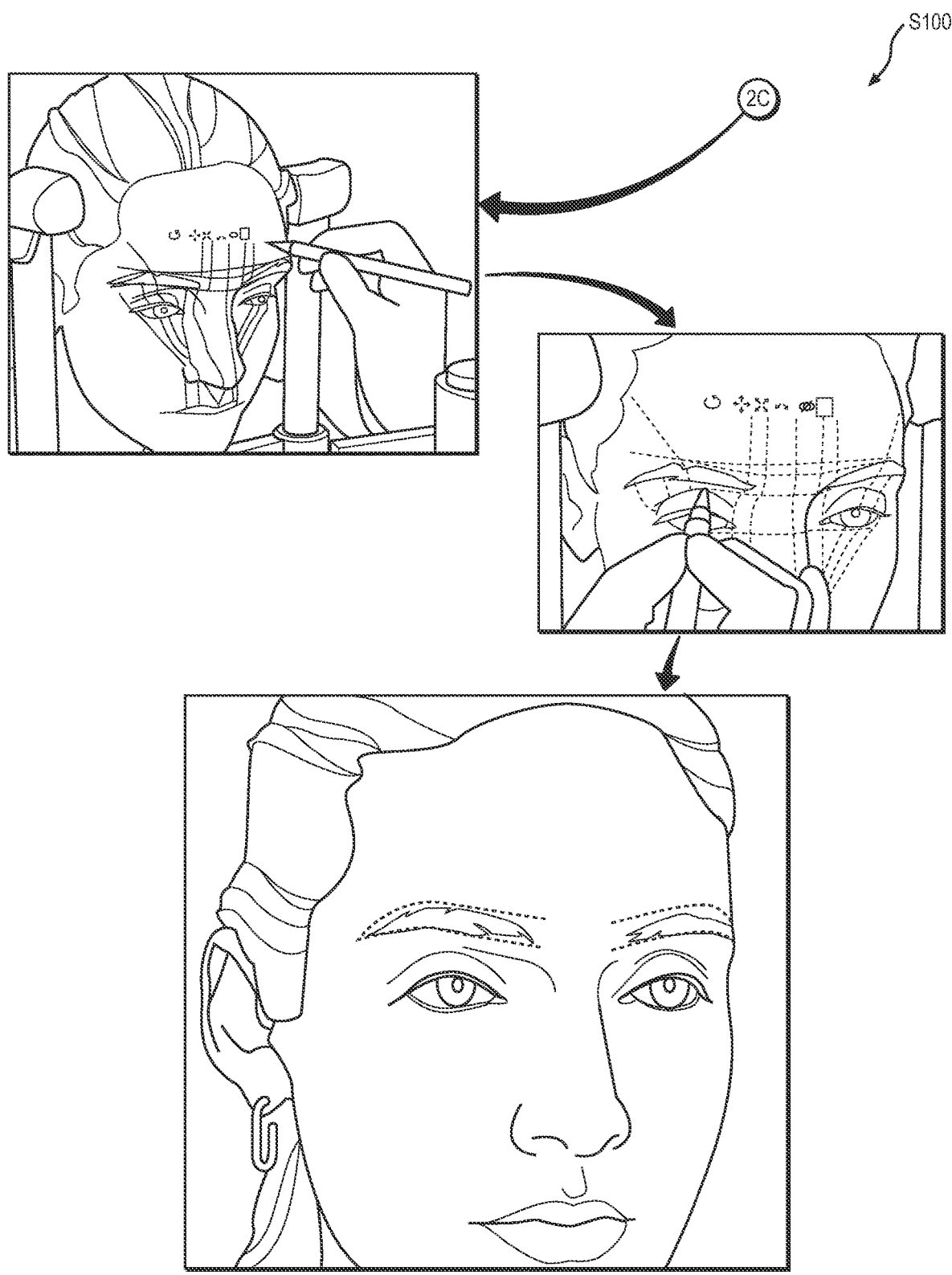

In one implementation shown in FIGS. 2A, 2B, and 2C, the projection system includes a single light projector, and the system interfaces with an operator to manually align facial references in the canvas image to facial features of the user and to "design" new target left and right eyebrow geometries for the user in real-time at the system 100, such as without prior knowledge of the user or existing target eyebrow geometries stored in the user profile.

4.1 Initial Configuration

In this implementation, once the user arrives at the system 100 (e.g., in a salon) and places her face against the chin and temple supports, the operator may activate system and initiate a setup cycle at the system 100.

The system 100 then projects a pair of eye markers onto the user's face at a low light intensity via the projection system and prompts the operator to align these eye markers to the user's eye. For example, the system 100 can: project a pair of low-light-intensity circles of diameters approximating (e.g., 120% of) a common or average diameter of a human iris; prompt the operator to shift these circles laterally and vertically—via the user interface—to align with the user's left and right pupils; and update positions of these circles—projected by the projection system—based on the subsequent inputs from the operator. Once the operator confirms alignment of these circles with the user's eyes, the system 100 can store areas within and/or around these circles (e.g., areas spanning the user's entire left and right eyes) as keepout projection zones. During subsequent operation, the system 100 can mute or otherwise avoid projecting light within these keepout projection zones. The system 100 can further transition to projecting higher-intensity light onto the user's face, thereby enabling the operator to view elements of the canvas image projected onto the user's face more easily and/or in greater detail without visual discomfort to the user.

Therefore, during the setup period, the system 100 can: project a set of eye markers onto the face of the user; serve a prompt to an operator to aligning the set of eye markers with eyes of the user; relocate the set of eye markers—projected onto the face of the user—according to inputs received from the operator to align the set of eye markers to eyes of the user; and mute elements in the canvas image—projected onto the face of the user—intersecting the set of eye markers.

4.2 Canvas Image+Canvas Alignment

Block S110 of the method recites accessing a canvas image; and Block S140 of the method S100 recites, via a projection system, projecting the canvas image onto a face of a user located on a headrest facing the projection system. Generally, in Block S110, the system 100 can access a canvas image including: a set of facial references (e.g., lines, vertices); and a set of arcs defining target left and right eyebrow geometries and geometry linked to the set of facial references. In Block S140, the system 100 can project this canvas image onto the user's face via the projection system.

In one implementation, the canvas image defines target left eyebrow geometry that includes: a left inner eyebrow vertex; a left outer eyebrow vertex; a left upper eyebrow arc (e.g., a spline, a Bezier curve) extending between the left inner eyebrow vertex and the left outer eyebrow vertex; a left upper eyebrow arc point intersecting a horizontal tangent of the left upper eyebrow arc; a left lower eyebrow arc extending between the left inner eyebrow vertex and the left outer eyebrow vertex below the left upper eyebrow arc; and a left lower eyebrow arc point intersecting a horizontal tangent of the left lower eyebrow arc. In this implementation, the canvas image also defines target right eyebrow geometry that includes: a right inner vertex; a right outer vertex; a right upper arc extending between the right inner vertex and the right outer vertex; a right upper arc point intersecting a horizontal tangent of the right upper arc; a right lower arc extending between the right inner vertex and the right outer vertex below the right upper arc; and a right lower arc point intersecting a horizontal tangent of the right lower arc.

In this implementation, upon initiation of the augmentation period, the system 100 can: retrieve a nominal canvas image from local memory or from a remote database; and trigger the projection system to project the nominal canvas image onto the user's face.

4.2.1 Linked Elements

Furthermore, elements of target eyebrow geometries defined in the canvas image can be linked to facial references in the canvas image by geometric rules. In particular, these geometric rules can define length ratios and/or angles between these arcs and lines.

In one implementation, the canvas image includes a left vertical inner eye line and a left outer eyebrow vertex. In this implementation, the canvas image also includes a left vertical inner eyebrow line: arranged between the vertical face centerline and the left vertical inner eye line; laterally offset from the vertical face centerline by a first distance; and laterally offset from the left vertical inner eye line by a second distance related to the left distance by a nominal ratio (e.g., 1.62, or the "Golden ratio"). In this implementation, the canvas image further includes a left upper eyebrow arc point: arranged between the left vertical inner eyebrow line and the left outer eyebrow vertex; laterally offset from the left vertical inner eyebrow line by a third distance; and laterally offset from the left outer eyebrow vertex by a fourth distance related to the third distance by the nominal ratio. In this implementation, the canvas image further includes a target left eyebrow geometry including the left set of curvilinear segments extending between the vertical inner eyebrow line, the left outer eyebrow vertex, and the left upper eyebrow arc point.

Therefore, response to manual manipulation of any of these elements of the canvas image, the system 100 can update positions or geometries of other elements in the canvas image, such as including the target left and right eyebrow geometries defined in the canvas image, according to these geometric rules.

However, the canvas image can define any other set of vertices, lines, and curvilinear elements that cooperate to define a set of facial references and target eyebrow geometries and/or that are linked according to any other geometric rules.

4.2 Manual Canvas Image Alignment and Manipulation

Block S130 of the method S100 recites: aligning the vertical face centerline of the canvas image to a center of the face of the user; and locating curvilinear segments, in the first set of curvilinear segments of the target first eyebrow geometry in the canvas image, relative to features of the first eyebrow of the user. Generally, in Block S130, interfaces with the operator to manually align feature references in the canvas image to the user's facial features, thereby tailoring the canvas image to the user's unique face.

In one implementation described above, the canvas image defines target left eyebrow geometry that includes: a left inner eyebrow vertex; a left outer eyebrow vertex; a left upper eyebrow arc extending between the left inner eyebrow vertex and the left outer eyebrow vertex; a left upper eyebrow arc point intersecting a horizontal tangent of the left upper eyebrow arc; a left lower eyebrow arc extending between the left inner eyebrow vertex and the left outer eyebrow vertex below the left upper eyebrow arc; and a left lower eyebrow arc point intersecting a horizontal tangent of the left lower eyebrow arc. In this implementation, the canvas image also defines target right eyebrow geometry that includes: a right inner vertex; a right outer vertex; a right upper arc extending between the right inner vertex and the right outer vertex; a right upper arc point intersecting a horizontal tangent of the right upper arc; a right lower arc extending between the right inner vertex and the right outer vertex below the right upper arc; and a right lower arc point intersecting a horizontal tangent of the right lower arc. In this implementation, the system 100 can: receive a lateral position input from the operator via the user interface; and shift the canvas image laterally according to the lateral position input to align the vertical face centerline of the canvas image to the center of the face of the user. Similarly, the system 100 can: receive a first position input from the operator via the user interface; relocate the left inner eyebrow vertex, of the target left eyebrow geometry projected onto the face of the user, according to the first lateral input to align the left inner eyebrow vertex in the canvas image to an inner edge of the left (e.g., a preferred) eyebrow of the user; receive a second position input from the operator via the user interface; relocate the left outer eyebrow vertex, of the target left eyebrow geometry projected onto the face of the user, according to the second lateral input to align the left outer eyebrow vertex in the canvas image to an outer edge of the left (e.g., preferred) eyebrow of the user; receive a third position input from the operator via the user interface; relocate the left upper eyebrow arc point, of the target left eyebrow geometry projected onto the face of the user, according to the third lateral input to align the left upper eyebrow arc point in the canvas image to a peak of an upper edge of the left (e.g., preferred) eyebrow of the user; receive a fourth position input from the operator via the user interface; and relocate the left lower eyebrow arc point, of the target left eyebrow geometry projected onto the face of the user, according to the fourth lateral input to align the left lower eyebrow arc point in the canvas image to a peak of a lower edge of the left (e.g., preferred) eyebrow of the user.

In a similar implementation described above, the canvas image includes a left vertical inner eye line and a left outer eyebrow vertex. In this implementation, the canvas image also includes a left vertical inner eyebrow line: arranged between the vertical face centerline and the left vertical inner eye line; laterally offset from the vertical face centerline by a first distance; and laterally offset from the left vertical inner eye line by a second distance related to the left distance by a nominal ratio (e.g., 1.62, or the "Golden ratio"). In this implementation, the canvas image further includes a left upper eyebrow arc point: arranged between the left vertical inner eyebrow line and the left outer eyebrow vertex; laterally offset from the left vertical inner eyebrow line by a third distance; and laterally offset from the left outer eyebrow vertex by a fourth distance related to the third distance by the nominal ratio. In this implementation, the canvas image further includes a target left eyebrow geometry including the left set of curvilinear segments extending between the vertical inner eyebrow line, the left outer eyebrow vertex, and the left upper eyebrow arc point. In this implementation, the system 100 can: receive a lateral position input from an operator via a user interface; and shift the canvas image—projected onto the face of the user— according to the lateral position input to align the vertical face centerline of the canvas image to the center of the face of the user. In this implementation, the system 100 can also: receive a second lateral position input from the operator via the user interface; relocate the first vertical inner eye line— projected onto the face of the user—according to the second lateral input to align the first vertical inner eye line in the canvas image to an inner edge of a first eye of the user; locate the first vertical inner eyebrow line between the vertical face centerline and the first vertical inner eye line according to the nominal ratio; receive a third lateral position input from the operator via the user interface; relocate the first outer eyebrow vertex—projected onto the face of the user—according to the third lateral input to align the first outer eyebrow vertex in the canvas image to an outer edge of a first eyebrow of the user; and relocate the first upper eyebrow are point between the first vertical inner eyebrow line and the first outer eyebrow vertex line according to the nominal ratio.

4.4 Example: Eyebrow Design

In one implementation, upon initiation of the augmentation period, the system 100 can: retrieve a nominal canvas image from local memory or from a remote database; and trigger the projection system to project the nominal canvas image onto the user's face.

For example, the nominal canvas image can include a set of vertical lines representing: a center of a nominal face; a center of the left and right eyes of a nominal face; left and right lateral boundaries of left and right eyes of a nominal face; left and right lateral boundaries of a nominal face; and/or left and right lateral boundaries of eyebrows of a nominal face. The nominal canvas image can also include a set of horizontal lines: configured to intersect pupils of a nominal face; upper and lower vertical boundaries of upper edges of eyebrows of a nominal face; and upper and lower vertical boundaries of lower edges of eyebrows of a nominal face. The nominal canvas image can also include a vertex configured to intersect a Cupid's bow of a nominal face. The nominal canvas image can further include a set of inclined lines extending from the vertex to: maximal edges of the left and right eyebrows of a nominal face; horizontal tangents (or peaks, are points) of lower edges of the left and right eyebrows of a nominal face; and/or horizontal tangents (or peaks, are points) of upper edges of the left and right eyebrows of a nominal face. The nominal canvas image can also include: nominal left and right eyebrow geometries, each including a set of arcs and lines; and a set of vertices that anchor intersections between these vertical lines, horizontal lines, inclined lines, and lines that form the nominal left and right eyebrow geometries of a nominal face. The system 100 then projects this nominal canvas image onto the user's face.

The system 100 prompts the operator to: align (e.g., by dragging) the Cupid's bow vertex of the canvas image onto the user's Cupid's bow via the user interface; align (e.g., by rotating) the vertical face centerline of the canvas image to a vertical center of the user's nose and brow; align (e.g., by dragging) horizontal and vertical lines of the canvas image into alignment with centers of the user's pupils, edges of the user's eye caruncles, and/or edges of the user's face, etc. The system 100 then updates: positions of other elements in the canvas image according to stored geometric rules, as described above; and projects the updated canvas image onto the user accordingly.

The user indicates a preferred (e.g., left) eyebrow to the operator. Accordingly, the operator drags (or scrolls, shifts) elements of the canvas image via the user interface to locate a target left eyebrow geometry (e.g., an eyebrow perimeter or boundary)—in the canvas image projected onto the user's face—directly over the user's existing left eyebrow. The system 100: updates positions of vertices, line, and/or arcs within the canvas image responsive to these inputs from the operator; and projects the updated canvas image onto the user's face in real-time.

In particular, in this implementation, the operator manually aligns the left vertical inner eye line described above to the user's left caruncle. The system 100 then locates the inner vertical eyebrow line between the vertical centerline and the left vertical inner eye line according to nominal ratio described above, thereby defining an inner corner or edge of the target left eyebrow geometry.

The operator then manually adjusts a vertical position of a horizontal eyebrow line to intersect the inner lower corner of the left eyebrow, thereby manually setting a vertical position of the inner lower corner of the target left eyebrow geometry.

The operator further manually moves the outer left eyebrow vertex to align to the outer corner of the user's left eyebrow. The system 100 then locates the left upper eyebrow are point (or vertex, horizontal tangent) of the target left eyebrow geometry between the inner vertical eyebrow line and the outer left eyebrow vertex according to according to nominal ratio described above, thereby defining a lateral position of a peak of the upper edge of the target left eyebrow geometry.

The operator then drags vertices on upper and lower curves of the target left eyebrow geometry to align to the upper and lower edges user's left eyebrow. The operator further drags or otherwise adjusts radii of the arcs that form the upper and lower curves of the target left eyebrow geometry to match the profile of the user's left eyebrow.

Additionally or alternatively, the operator can drag or otherwise move these vertices, lines, and/or arcs inside of or outside of the profile of the user's left eyebrow, thereby deviating the target left eyebrow geometry from the current aesthetic of the user's left eyebrow, such as to: define a thicker or thinner target left eyebrow geometry; define a flatter or more curved target left eyebrow geometry; define a wider or narrower target left eyebrow geometry; or define a more or less tapered target left eyebrow geometry. The system updates the canvas image and projects the updated canvas image onto the user's face accordingly in real-time.

4.5 Mirroring Unlock

Block S132 of the method S100 recites mirroring curvilinear segments, in the second set of curvilinear segments of the target second eyebrow geometry in the canvas image projected onto the face of the user, across the vertical face centerline. Generally, in Block S132, the system 100 can mirror the target left eyebrow geometry across the vertical face centerline to define the target right eyebrow geometry while the operator adjusts the target left eyebrow geometry in the canvas image (or vice versa) such that the target left and right eyebrow geometries are identical and equally positioned across the centerline.

For example, the system 100 can mirror the target right eyebrow geometry across the vertical face centerline from the target left eyebrow geometry by: mirroring the right inner vertex of the target right eyebrow geometry across the vertical face centerline from the left inner eyebrow vertex of the target left eyebrow geometry; mirroring the right outer vertex of the target right eyebrow geometry across the vertical face centerline from the left outer eyebrow vertex of the target left eyebrow geometry; mirroring the right upper arc of the target right eyebrow geometry across the vertical face centerline from the left upper eyebrow arc of the target left eyebrow geometry; and mirroring the right lower arc of the target right eyebrow geometry across the vertical face centerline from the left lower eyebrow arc of the target left eyebrow geometry.

Therefore, the system 100 can maintain symmetry of the target right eyebrow geometry across the centerline of canvas image as the operator moves vertices, lines, and arcs defining the target left eyebrow geometry (or vice versa).

4.6 Constraint Unlock

In one implementation, the system 100: receives a symmetry deactivation input from the operator via the user interface; and disables symmetry of the left and right eyebrow geometries across the vertical face centerline accordingly. Subsequently, in response to receiving a repositioning input from the operator via the user interface to modify a position of an element of the target right eyebrow geometry, the system 100: relocates this element of the target right eyebrow geometry—projected onto the face of the user— according to this repositioning input and without modifying a position of the corresponding element of the target left eyebrow geometry on the opposing side of the vertical face centerline.

Therefore, responsive to a symmetry deactivation input from the operator, the system 100 can unlock a symmetry constraint and thus enable the operator to define asymmetric target left and right eyebrow geometries.

Similarly, responsive to inputs from the operator, the system 100 can disable geometry rules that define relative positions of elements of the canvas image, thereby enabling the operator to define target left and right eyebrow geometries that deviate from (i.e., independent of) these geometry rules.

4.7 Eyebrow Design Confirmation+Alignment Markers

Then, in response to receiving confirmation of the target left and right eyebrow geometries—defined in the canvas image projected onto the face of the user—from the operator, the system 100 can project a set of (e.g., two, three) alignment markers (e.g., "dots") onto the user's face (e.g., forehead) adjacent the canvas image. The system 100 can also generate a prompt: to temporarily apply a set of marks coincident the set of alignment markers on the user's face; and to then trace outlines of the target left and right eyebrow geometries onto the user's face while maintaining the set of marks coincident the set of alignment markers. The system 100 can serve the prompt to the operator proximal the user to complete the augmentation period.

In particular, once the operator confirms the target left and right eyebrow geometries, the system 100 can: lock the vertices, lines, and/or arcs defined in the canvas image; project a set of alignment markers (e.g., two dots)—adjacent the projected canvas image—onto the user's face; and prompt the user to annotate the user's face at the alignment markers, such as by applying a "dot" directly over each alignment marker with a temporary marker. The system 100 then prompts the operator to trace the outlines of the target left and right eyebrow geometries—currently projected onto the user's face via the projection system—while maintaining the temporary annotations on the user's face in alignment with the alignment markers.

Once the operator fully traces the outlines of the target left and right eyebrow geometries, the system 100 can disable the projection system. The user may then remove her face from the headrest. The operator (or other aesthetician) may then microblading, applying ombre, nanostroking, tattooing, tinting, waxing, tweezing, threading, transplanting, or otherwise augmenting or modifying the user's eyebrows within these traced outlines in order to augment the user's existing eyebrows according to the target law eyebrow geometries previously confirmed by the user and the operator. Additionally or alternatively, the operator may wax, pluck, thread, or otherwise remove hairs outside of these traced outlines.

5. Autonomous Operation+Preemptive/Remote Eyebrow Design

One variation of the method S100 shown in FIG. 1A includes, at a mobile device accessed by the user and prior to the annotation period: accessing a two-dimensional photographic image of the face of the user captured by a camera in the mobile device in Block S160; projecting the canvas image onto the two-dimensional photographic image in Block S162; rendering the two-dimensional photographic image, annotated with the canvas image, on a display of the mobile device in Block S164; receiving a sequence of inputs from the user via the mobile device in Block S166; adjusting the target first eyebrow geometry and the target second eyebrow geometry, of the canvas image, projected onto the two-dimensional photographic image according to the sequence of inputs in Block S168; and, in response to confirmation of the target first eyebrow geometry and the target second eyebrow geometry from the user storing the canvas image in an electronic profile associated with the user in Block S170. In this variation, the system 100 can later retrieve the canvas image from the electronic profile in Block S110.

Generally, in this variation, the user may access a web or native application executing on her computing device (e.g., smartphone, tablet, laptop computer) and initiate a design period and a new target eyebrow geometry win the application. The application then: initiates or accesses a user profile associate with the user, such as from a remote user database; captures an image of the user (hereinafter the "design image"); extracts a constellation of two-dimensional and/or three-dimensional facial features representative of the user's face from the image; renders the design image annotated with target left and right eyebrow geometries on a display of the computing device; interfaces with the user via the computing device to adjust the target left and right eyebrow geometries according to the user's preferences; defines a location (i.e., a position and orientation) of these target left and right eyebrow geometries relative to the constellation of facial features; and writes the target left and right eyebrow geometries and their locations relative to the constellation of facial features to a canvas image; and stores in this canvas image in the user's profile.

Later, once the user enters a salon (or other physical location) occupied by the system 100, an operator in the salon enters identifying user information linked to the user's profile, such as via the user interface. The system 100 then: access the user's profile according to this identifying user information; and loads canvas image—defining the target left and right eyebrow geometries relative to the constellation of facial features of the user—from the user's profile.

The user then places her face on the chin and temple supports. The system 100 then: captures images of the user via a camera in the imaging system; detects facial features in these images; calculates a transform that maps facial features detected in these images to the constellation of facial features defining the location of the target left and right eyebrow geometries in the canvas image; transforms (e.g., scales, skews, distorts) the canvas image based on this transform and a known offset between the camera and a light projector in the projection system; projects this canvas image—thus aligned to the user's facial features—onto the user's face; and prompts the operator to trace outlines of the target left and right eyebrow geometries thus projected onto the user's face.

The operator (or other aesthetician) may then microblading, applying ombre, nanostroking, tattooing, tinting, waxing, tweezing, threading, transplanting, or otherwise augmenting or modifying the user's eyebrows within these traced outlines in order to augment the user's existing eyebrows according to the target law eyebrow geometries previously confirmed by the user and the operator. Additionally or alternatively, the operator may wax, pluck, thread, or otherwise remove hairs outside of these traced outlines.

5.1 Facial Landmarks in Design Image

In one implementation shown in FIG. 1A, during the design period, the application executing on user's computing device prompts the user to capture (or select) an image of the user's face.

The application then: detects a constellation of facial landmarks in the design image, such as by implementing a facial landmark model or other computer vision or artificial intelligence techniques to detect presence and positions of facial landmarks in the design image including: centers of the user's pupils; inner and outer corners of the user's left and right eyes; inner and outer corners of the user's left and right eyebrows; upper and lower arcpoints (or horizontal tangent vertices) of the user's left and right eyebrows; top center (or Cupid's bow) of the user's upper lip; points or spline along the user's nose; points or spline along the edges of the user's face; points or spline along the user's jawline; and/or a vertical face centerline of the user's face.

5.2 Canvas Image Alignment

The application then: retrieves the nominal canvas image—described above and including linked or intersecting vertices, lines, and/or arcs defining relative positions of facial references and target eyebrow geometries; and automatically aligns these facial references in the canvas image to corresponding facial landmarks detected in the design image.

For example, the application can autonomously: align the Cupid's bow vertex of the canvas image to the user's Cupid's bow detected in the design image; rotate the canvas image to center the vertical face centerline of the canvas image between facial landmarks representing the user's nose detected in the design image; and snap horizontal and vertical lines in the canvas image to the user's pupils, corners of the user's eyes, and/or edges of the user's face detected in the design image.

5.3 Target Left and Right Eyebrow Geometries+Eyebrow Design Options

The application then generates initial target left and right eyebrow geometries over the design image based on (e.g., matched to) the current profile of the user's left eyebrow (or right eyebrow, such as if selected by the user) by: aligning vertices, lines, and/or arcs defining the target left eyebrow geometry in the canvas image to facial landmarks detected in the design image; and maintaining symmetry between the target left and right eyebrow geometries across the vertical face centerline of the canvas image.

For example, the application can automatically: align a vertical left inner eye line defining in the canvas image to an inner left corner (or left caruncle) of the user's left eye detected in the design image; offset an inner vertical line of the target left eyebrow geometry in the canvas image from the vertical left inner eye line according to fixed, predefined ratio; align a left inner horizontal brow line in the canvas image to an inner lower corner of the left eyebrow detected in the design image; align a left outer eyebrow vertex in the canvas image to an outer corner of the left eyebrow detected in the design image; horizontally offset a left upper eyebrow are point (or vertex, horizontal tangent) of the target left eyebrow geometry defined in the canvas image between the left outer eyebrow vertex and the inner vertical line of the target left eyebrow geometry according to a predefined nominal ratio described above; snap the left upper eyebrow are point in the canvas image to an interpolated spline between facial landmarks representing the upper edges of the user's left eyebrow in the design image; and snap a left lower eyebrow are point of the target left eyebrow geometry in the canvas image to an interpolated spline between facial landmarks representing the lower edges of the user's left eyebrow in the design image.

Therefore, the application can automatically define the target left eyebrow geometry in the canvas image based on predefined rules (e.g., ratios) of linear and/or angular offsets between vertices, lines, and/or arcs in the canvas image and facial landmarks detected in the design image.

The application can then: mirror the geometry of the target left eyebrow geometry across the centerline to define a target right eyebrow geometry; and store these target left and right eyebrow geometries as a first eyebrow design option.

In one variation, the application repeats the foregoing process for the right eyebrow to: define target left and right eyebrow geometries based on the current profile of the user's right eyebrow; and store these target left and right eyebrow geometries as a second eyebrow design option. The application can also implement similar methods and techniques to define target left and right eyebrow geometries similar to the current profile of the user's left or right eyebrow but wider, narrower, thicker, thinner, flatter, or more arched, etc. than the current profile of either the user's left or right eyebrow, as detected in the design image; and store these target left and right eyebrow geometries as additional eyebrow design options.

Therefore, the system 100 can implement deterministic or programmatic eyebrow definitions to generate a set of eyebrow design options based on facial landmarks, eyebrow profiles, or other facial features detected in the design image.

5.4 Eyebrow Design Option Presentation+Selection

As shown in FIG. 1A, the application can then: project the first eyebrow design option over design image; render the design image—annotated with the first eyebrow design option—on the display of the computing device; and prompt the user to confirm, discard, or modify the first eyebrow design option. If the user confirms the first eyebrow design option, the application can: store the target left and right eyebrow geometries defined in the first eyebrow design option in the user's profile; and discard the remaining eyebrow design options.

Alternatively, if the user discards the first eyebrow design option, the application can: project the second eyebrow design option over design image; render the design image—now annotated with the second eyebrow design option—on the display of the computing device; and repeat the foregoing process to respond to confirmation, discard, or modification of the second eyebrow design option.

Yet alternatively, if the user elects to modify the first eyebrow design option, the application can: further augment the design image with the complete canvas image, such as including vertices, lines, and arcs aligned to facial landmarks detected in the design image; interface with the user via the display to modify the target left and right eyebrow geometries defined in the canvas image based on positional changes to vertices, lines, and arcs in the canvas image rendered over the design image, such as described above; and repeat the foregoing process to respond to confirmation, discard, or modification of this modified eyebrow design option.

Additionally or alternatively, if the user elects to modify the first eyebrow design option, the application can render a set of virtual sliders, menus, or other input fields to thin, thicken, flatten arch, widen, narrow, or otherwise modify the target left and right eyebrow geometries; programmatically modify vertices, lines, and arcs in the canvas image—rendered over the design image—many on user inputs to these fields; and update the target left and right eyebrow geometries accordingly.

5.5 Eyebrow Stroke Orientation

In one variation shown in FIG. 1A, the application further implements edge detection, line detection, template matching, and/or other artificial intelligence or computer vision techniques to detect individual hairs within the left eyebrow of the user detected in the design image. Then, for each hair detected in the target left eyebrow geometry, the application: detects a first end and a second end of the hair; characterizes a first thickness of the hair proximal the first end; characterizes a second thickness of the hair proximal the second end; characterizes a length of the hair; identifies the first end as a root end of the hair in response to the first thickness exceeding the second thickness; defines a hair vector including a vertex located at the first root end of the hair, defining a length corresponding to the length of the hair, and defining an orientation extending between the first and second ends of the hair; and locates the hair vector—at this location and orientation—within the target left eyebrow geometry if the origin of this hair vector falls within the boundary of the target left eyebrow geometry selected by the user.

In this variation, if the target left eyebrow geometry includes a region that extends beyond the boundary of the user's left eyebrow, the application further: extrapolates lengths, orientations, and densities of hairs within this region of the target left eyebrow geometry based on the hair vectors; and populates this region of the target left eyebrow geometry with extrapolated vectors representing these extrapolated lengths, orientations, and densities of hairs.

Additionally or alternatively, if the user elects heavier eyebrows, such as via a menu within the application, the application can implement similar methods and techniques to: interpolate lengths, orientations, and densities of additional hairs within the target left eyebrow geometry between the foregoing hair vectors; and populate the target left eyebrow geometry with interpolated vectors representing these interpolated lengths, orientations, and densities of hairs.

In a similar variation, the application can: implement edge detection, line detection, template matching, and/or other artificial intelligence or computer vision techniques to detect individual hairs; and then group hairs into hair clusters, such as a total of ten hair clusters within the target left eyebrow geometry, one hair cluster per 100 individual hairs, or one hair cluster per 0.1" by 0.1" area within the target left eyebrow geometry. Then, for each hair cluster defined in the target left eyebrow geometry, the application can: implement methods and techniques described above to detect roots and distal ends of hairs in the hair cluster; calculate an average root position of hairs in the cluster; calculate an average length of hairs in the hair cluster; calculate an average orientation of hairs in the hair cluster; define a composite vector including a vertex located at the average root position, defining the average length, and defining the average orientation of the cluster of hairs; and locate the composite vector—at this average location and average orientation—within the target left eyebrow geometry.

In this implement, if the target left eyebrow geometry includes a region that extends beyond the boundary of the user's left eyebrow, the application can: extrapolate lengths, orientations, and densities of hairs within this region of the target left eyebrow geometry based on these composite vectors; and populate this region of the target left eyebrow geometry with extrapolated vectors representing these extrapolated lengths, orientations, and densities of hairs.

The system 100 can repeat the foregoing process separately for the target right eyebrow geometry paired with this target right eyebrow geometry (i.e., rather than mirroring hair vectors from the target left eyebrow geometry to the target right eyebrow geometry) such that hair vectors within the target right eyebrow geometry reflect actual hairs extant in the user's right eyebrow.

The application can then render target left and right eyebrow geometries—populated with vectors representing extant hairs, interpolated hairs or hair patterns, and/or extrapolated hairs or hair patterns—on the display of the user's computing device, thereby enabling the user's to further view density and/or orientations of hairs corresponding to a selected eyebrow design option.

Furthermore, the system 100 can: re-interpolate or re-extrapolate vectors representing individual hairs or hair patterns within the target left and right eyebrow geometries responsive to changes to the target left and right eyebrow geometries entered by the user via the application; render these on the user's mobile device; and store these vectors with the target left and right eyebrow geometries in the user's profile.

Later, the system 100 can project both the target left and right eyebrow geometries and these vectors onto the user's face to enable the operator to annotate the user's face with both eyebrow outlines and eyebrow hair positions, orientations, and/or densities previously designed and confirmed by the user.

For example, at the mobile device and prior to the annotation period, the application can: detect a first eyebrow in the two-dimensional photographic image; and detect a first set of eyebrow hair clusters within a real boundary of the first eyebrow detected in the two-dimensional photographic image. Then, for each eyebrow hair cluster in the first set of eyebrow hair clusters, the application can: interpret a representative length of hairs in the eyebrow hair cluster based on features detected in the two-dimensional photographic image; interpret a representative orientation of hairs in the eyebrow hair cluster based on features detected in the two-dimensional photographic image; interpret a representative root origin of hairs in the eyebrow hair cluster based on features detected in the two-dimensional photographic image; generate a representative vector for the eyebrow hair cluster based on the representative length and the representative orientation; and locate the representative vector, in a set of representative vectors, within the real boundary of the first eyebrow according to the first representative root origin. The application can then extrapolate a set of virtual vectors, from the set of representative vectors, within the target first eyebrow geometry and outside of the real boundary of the first eyebrow; and populate the target first eyebrow geometry in the canvas image with the set of virtual vectors. During the annotation period, the system 100 can then: project the target first eyebrow geometry onto the face of the user; and project the set of virtual vectors onto the face of the user, within the target first eyebrow geometry, and outside of the real boundary of the first eyebrow of the user.

5.6 System Operation with Operator

Later, once the user enters a salon (or other physical location) occupied by the system 100, an operator in the salon enters identifying user information linked to the user's profile, such as via the user interface. The system 100 then retrieves the canvas image, which is stored in the electronic profile associated with user and that was generated prior to the annotation period at a mobile device separate from the projection system.

The user then places her face on the chin and temple supports. As shown in FIG. 1B, the system 100 then: captures images of the user via a camera in the imaging system; detects facial features in these images; calculates a transform that maps facial features detected in these images to the constellation of facial features defining the location of the target left and right eyebrow geometries in the canvas image; transforms (e.g., scales, skews, distorts) the canvas image based on this transform and a known offset between the camera and a light projector in the projection system; and projects this canvas image—thus aligned to the user's facial features—onto the user's face.

5.6.1 Three-Dimensional Facial Representation

In one implementation shown in FIG. 1B, the system 100 includes: two laterally-offset cameras; and two laterally-offset light projectors. In this implementation, the system 100 can: selectively project a sequence of structured light onto the user's face via the projection system (e.g., left and right light projectors) while capturing a sequence of images of the user's face via the imaging system (e.g., via left and right cameras, a single camera, and/or a depth sensor, as described above); generate a three-dimensional facial representation of the user's face based on structured light projections detected in the sequence of images; and detect a three-dimensional constellation of facial features in the three-dimensional facial representation, such as by implementing a facial landmark model to detect eye, brow, nose, lip, and/or jawline features.

The system 100 then calculates a first transform that projects the two-dimensional constellation of facial landmarks—extracted from the design image during the design period and defining the position of the canvas image relative to the user's face—onto corresponding facial features in the three-dimensional constellation of facial features detected in the three-dimensional facial representation. More specifically, the system 100 can: select a first facial landmark in the two-dimensional constellation of facial landmarks detected in the design image and associated with the location of the canvas image on the user's face; identify a corresponding facial feature in the three-dimensional facial representation of the user; associate the first facial landmark and the corresponding facial feature; and repeat this process for each other facial landmark associated with the location of the canvas image on the user's face. The system 100 then calculates a transform that projects each facial landmark in the two-dimensional constellation of facial landmarks—associated with the location of the canvas image on the user's face—onto its corresponding facial feature detected on the surface of the three-dimensional facial representation.

The system 100 then applies the first transform to the canvas image—stored in the user's profile and located relative to the two-dimensional constellation of facial landmarks—to project the target left and right eyebrow geometries onto the surface of the three-dimensional facial representation. More specifically, the application defines the two-dimensional target left and right eyebrow geometries relative to the two-dimensional constellation of facial landmarks detected in the design image. Accordingly, a transform that projects these two-dimensional facial landmarks onto corresponding three-dimensional facial features on the surface of the three-dimensional facial representation may also project the two-dimensional target left and right eyebrow geometries—defined over the two-dimensional design image during the design period—onto correct regions of the three-dimensional surface of the three-dimensional facial representation.

The system 100 then locates a known two-dimensional image plane of the left light projector relative to the three-dimensional facial representation, such as based on a known position of the left light projector relative to the left and right cameras and/or known properties of the left light projector; projects the three-dimensional target left eyebrow geometry—defined on the surface of the three-dimensional facial representation—onto the two-dimensional image plane of the left light projector to generate a left canvas image; projects the left canvas image onto the left side of the user's face via the left light projector; and repeats this process for the target right eyebrow geometry and the right light projector to generate and project a right canvas image onto the right side of the user's face via the right light projector.

For example, during the annotation period, the system 100: projects structured light onto the face of the user via a left light projector and a right light projector in the projection system, the right light projector laterally offset from the left light projector; captures a set of two-dimensional images via a left optical sensor and a right optical sensor facing the user; compiles the set of two-dimensional images into a three-dimensional facial representation of the face of the user based on structured light detected in the set of two-dimensional images; detects a set of facial landmarks in the three-dimensional facial representation; and virtually projects the canvas image onto the three-dimensional facial representation. The system 100 then centers the vertical face centerline of the canvas image, projected onto the three-dimensional facial representation, between the set of facial landmarks in Block S130; locates curvilinear segments, of the target first eyebrow geometry of the canvas image projected onto the three-dimensional facial representation, relative to facial landmarks in the set of facial landmarks in Block S130; virtually defines a left field of view of the left light projector relative to the three-dimensional facial representation based on a known position of the left light projector; virtually defines a right field of view of the right light projector relative to three-dimensional facial representation based on a known position of the right light projector; projects the canvas image from three-dimensional facial representation onto the left field of view to define a left canvas image; projects the canvas image from three-dimensional facial representation onto the right field of view to define a right canvas image; projects the left canvas image onto the face of the user via left light projector Block S140; and projects the right canvas image onto the face of the user via the right light projector Block S140.

The system 100 then prompts the operator to edit or confirm the target left and right eyebrow geometries thus projected on the user. In response to the operator confirming these target left and right eyebrow geometries, the system 100 can: project a set of alignment markers (e.g., two dots)—adjacent the projected canvas image—onto the user's face; prompt the operator to annotate the user's face at the alignment markers, such as by applying a "dot directly over each alignment marker with a temporary marker;

prompt the operator to then trace the outlines of the target left and right eyebrow geometries and/or annotations therein on the user's face. The operator (or other aesthetician) may then microblading, applying ombre, nanostroking, tattooing, tinting, waxing, tweezing, threading, transplanting, or otherwise augmenting or modifying the user's eyebrows within these traced outlines in order to augment the user's existing eyebrows according to the target law eyebrow geometries previously confirmed by the user and the operator. Additionally or alternatively, the operator may wax, pluck, thread, or otherwise remove hairs outside of these traced outlines 5.6.1.1 Real-Time Design Editing In one implementation, if the operator elects to edit the target left and right eyebrow geometries, the system 100 can project the complete canvas image—such as including vertices, lines, and/or arcs defining the target left and right eyebrow geometries and facial references described above—onto the three-dimensional facial representation. The system 100 can then: project the three-dimensional target left eyebrow geometry and facial references—defined on the surface of the left side of three-dimensional facial representation—onto the two-dimensional image plane of the left light projector to generate an augmented left canvas image; project this augmented left canvas image onto the left side of the user's face via the left light projector; and repeat this process for the target right eyebrow geometry and the right light projector to generate and project an augmented right canvas image onto the right side of the user's face via the right light projector.

The system 100 can then: prompt the operator to manipulate these vertices, lines, and/or arcs via the user interface, such as described above; update positions of the target left and right eyebrow geometries and the facial references—projected onto the three-dimensional facial representation—according to inputs entered by the operator; regenerate the augmented left and right canvas images accordingly; and project these augmented left and right canvas images onto the user via the left and right light projectors.

The system 100 can repeat this process as the operator manipulates these projected canvas images, such as until the operator confirms target left and right eyebrow geometries this projected on the user.

Furthermore, in response to a change in the target left or right eyebrow geometries, the system 100 can update interpolated and/or extrapolated vectors representing individual hairs or hair patterns within the target left and right eyebrow geometries (e.g., within regions of the target left and right eyebrow geometries not intersecting existing eyebrow hairs on the user's face). For example, in response to receiving a position input from the operator via the user interface during the annotation period, the system 100 can: modify a position of the target first eyebrow geometry in the canvas image, relative to the real boundary of the first eyebrow of the user, according to the position input; based on modification of the position of the target first eyebrow geometry relative to the real boundary of the first eyebrow, extrapolate a second set of virtual vectors, from the set of representative vectors, within the target first eyebrow geometry and outside of the real boundary of the first eyebrow; replace the set of virtual vectors in the target first eyebrow geometry in the canvas image with the second set of virtual vectors; and project the second set of virtual vectors onto the face of the user, within the target first eyebrow geometry, and outside of the real boundary of the first eyebrow of the user.

5.6.2.2 Face Tracking+Live Canvas Image

In another variation, after generating the three-dimensional facial representation at the start of the annotation period, the system 100 can: capture a set of images from the left and/or right cameras; implement facial landmark detecting and tracking to track a set of facial features in this set of images, such as the user's eyes, brow, lips, and/or jaw line, etc.; characterize a change in position of these facial features from an initial time—at which the cameras captured the sequence of images that formed three-dimensional facial representation—to the current time; derive a change in position of the user's head—relative to the left and right cameras—based on this change in position of these facial features; and virtually reorient the three-dimensional facial representation—relative to the virtual image planes of the left and right cameras described above—based on this change in position of the user's head.

The system 100 can then execute the processes described above to: project the three-dimensional target left eyebrow geometry—defined on the surface of the three-dimensional facial representation—onto the two-dimensional image plane of the left light projector to generate a left canvas image; project the left canvas image onto the left side of the user's face via the left light projector; and repeat this process for the target right eyebrow geometry and the right light projector to generate and project a right canvas image onto the right side of the user's face via the right light projector.

For example, the system 100 can: capture a second image via the left optical sensor; detect a second set of facial landmarks in the second image; interpret a change in orientation of the face of the user relative to the left light projector based on differences between the second set of facial landmarks and the set of facial landmarks; update a position of the three-dimensional facial representation relative to the left field of view and the right field of view based on the change in orientation of the face of the user relative to the left light projector; project the canvas image from three-dimensional facial representation onto the left field of view to define a second left canvas image; project the canvas image from three-dimensional facial representation onto the right field of view to define a second right canvas image; project the second left canvas image onto the face of the user via left light projector; and project the second right canvas image onto the face of the user via the right light projector.

Therefore, the system 100 can: track changes in position of the user's head relative to light projectors following generation of the three-dimensional facial representation; update left and right canvas images according to these changes in the position of the user's head; and project these updates left and right canvas images onto the user's face accordingly to maintain accurate positions of the target left and right eyebrow geometries projected onto the user's face even as the user's face moves relative to the projection system.

5.6.2 Two-Dimensional Facial Representation

In one variation, the system 100 includes: a single camera; and a single light projector. In this variation, the system 100 can implement methods and techniques similar to those described above to: capture a two-dimensional photographic image of the user's face via the camera; detect a set of facial landmarks in the two-dimensional photographic image; calculate a first transform that aligns the set of facial landmarks in the two-dimensional photographic image with the two-dimensional constellation of facial landmarks—extracted from the design image during the design period—that defines the position of the canvas image on the user's face. In this implementation, the system 100 further: retrieves a second transform that represents a known offset between the camera and the light projector; applies the first transform and the second transform to the canvas image to align the target left and right eyebrow geometries in the canvas image to the user's face in the field of view of the light projector; projects these target left and right eyebrow geometries onto the user's face via the light projector; interfaces with the operator to modify or confirm the target left and right eyebrow geometries and updates the canvas image; track the user's face in images captured by the camera; and updates the first transform and the canvas image accordingly.

6. Real-Time Autonomous Design by System

In one variation shown in FIG. 2B, the system 100 executes process described above to automatically: capture a two- or three-dimensional design image of the user once the user places her head on the headrest; detect facial landmarks in the image; automatically generate, modify, and/or align the canvas image to the user's face based on these facial landmarks; and/or automatically populate the target left and right eyebrow geometries with interpolated and/or extrapolated vectors represent individual hairs or hair patterns derived from characteristics of hairs detected within the users left and right eyebrows.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method comprising:
   accessing a canvas image comprising:
      a vertical face centerline;
      a target first eyebrow geometry:
         arranged on a first side of the vertical face centerline; and
         comprising a first set of curvilinear segments geometrically referenced to the vertical face centerline; and
      a target second eyebrow geometry:
         arranged on a second side of the vertical face centerline opposite the target first eyebrow geometry; and
         comprising a second set of curvilinear segments geometrically referenced to the vertical face centerline and the first set of curvilinear segments; and
   during an annotation period:
      via a projection system, projecting the canvas image onto a face of a user, located on a support facing the projection system:
         to visually indicate the target first eyebrow geometry proximal a first eyebrow of the user; and
         to visually indicate the target second eyebrow geometry proximal a second eyebrow of the user.

2. The method of claim 1:
   further comprising, during the annotation period:
      generating a three-dimensional facial representation of the face of the user based on a first set of images captured via a set of optical sensors facing the user; and
      detecting a first set of facial landmarks in the three-dimensional facial representation; and
   wherein projecting the canvas image onto the face of the user comprises automatically aligning the canvas image, projected onto the face of the user, to the first set of facial landmarks.

3. The method of claim 2, further comprising, during the annotation period:
   detecting a second set of facial landmarks in a second image captured via the set of optical sensors;
   interpreting a change in orientation of the face of the user relative to the projection system based on a difference between the second set of facial landmarks and the first set of facial landmarks; and
   updating a position of the three-dimensional facial representation, projected onto the face of the user, based on the change in orientation of the face of the user.

4. The method of claim 1:
   further comprising, at a mobile device accessed by the user and prior to the annotation period:
      accessing an image of the face of the user captured by the mobile device;
      projecting the canvas image onto the image;
      rendering the image, annotated with the canvas image, on a display of the mobile device;
      adjusting the target first eyebrow geometry and the target second eyebrow geometry according to a sequence of inputs entered by the user; and
      in response to confirmation of the target first eyebrow geometry and the target second eyebrow geometry from the user:
         storing the canvas image in an electronic profile associated with the user; and
   wherein accessing the canvas image comprises retrieving the canvas image from the electronic profile.

5. The method of claim 4:
   further comprising, at the mobile device and prior to the annotation period:
      detecting a first set of eyebrow hair clusters within a real boundary of the first eyebrow detected in the image;
      for each eyebrow hair cluster in the first set of eyebrow hair clusters:
         generating a representative vector for the eyebrow hair cluster based on features of hairs in the eyebrow hair cluster detected in the image; and
         locating the representative vector, in a set of representative vectors, within the real boundary of the first eyebrow according to a representative root origin of hairs in the eyebrow hair cluster detected in the image;

extrapolating a set of virtual vectors, from the set of representative vectors, within the target first eyebrow geometry and outside of the real boundary of the first eyebrow; and populating the target first eyebrow geometry in the canvas image with the set of virtual vectors; and wherein projecting the canvas image onto the face of the user comprises:

projecting the target first eyebrow geometry onto the face of the user; and projecting the set of virtual vectors, within the target first eyebrow geometry and outside of the real boundary of the first eyebrow of the user, onto the face of the user.

6. The method of claim 1, wherein accessing the canvas image comprises retrieving the canvas image stored in an electronic profile associated with the user and generated prior to the annotation period at a mobile device accessed by the user.

7. The method of claim 1:

wherein accessing the canvas image comprises accessing the canvas image comprising:

a vertical inner eye line;

a vertical inner eyebrow line:

arranged between the vertical face centerline and the vertical inner eye line; and laterally offset from the vertical inner eye line based on a nominal ratio;

an outer eyebrow vertex;

an upper eyebrow arc point:

arranged between the vertical inner eyebrow line and the outer eyebrow vertex; and laterally offset from the outer eyebrow vertex based on the nominal ratio; and the target first eyebrow geometry comprising the first set of curvilinear segments extending between the vertical inner eyebrow line, the outer eyebrow vertex, and the upper eyebrow arc point; and wherein projecting the canvas image onto the face of the user comprises:

receiving a first lateral position input from an operator;

relocating the vertical inner eye line, projected onto the face of the user, according to the first lateral position input to align the vertical inner eye line in the canvas image to an inner edge of a first eye of the user;

locating the vertical inner eyebrow line between the vertical face centerline and the vertical inner eye line according to the nominal ratio;

receiving a second lateral position input from the operator;

relocating the outer eyebrow vertex, projected onto the face of the user, according to the second lateral position input to align the outer eyebrow vertex in the canvas image to an outer edge of the first eyebrow of the user; and relocating the upper eyebrow arc point between the vertical inner eyebrow line and the outer eyebrow vertex according to the nominal ratio.

8. The method of claim 1:

wherein accessing the canvas image comprises accessing the canvas image comprising:

a vertical inner eye line;

a vertical inner eyebrow line arranged between the vertical face centerline and the vertical inner eye line;

an outer eyebrow vertex;

an upper eyebrow arc point arranged between the vertical inner eyebrow line and the outer eyebrow vertex; and the target first eyebrow geometry comprising the first set of curvilinear segments extending between the vertical inner eyebrow line, the outer eyebrow vertex, and the upper eyebrow arc point;

further comprising, during the annotation period, detecting a constellation of facial landmarks in an image captured by an optical sensor facing the user; and wherein projecting the canvas image onto the face of the user comprises:

aligning the vertical inner eye line, projected onto the face of the user, to an inner edge of a first eye in the constellation of facial landmarks detected in the image;

aligning the outer eyebrow vertex, projected onto the face of the user, to an outer edge of the first eyebrow in the constellation of facial landmarks detected in the image; and relocating the upper eyebrow arc point to intersect an upper edge of the first eyebrow in the constellation of facial landmarks detected in the image.

9. The method of claim 1:

wherein accessing the canvas image comprises accessing the canvas image comprising:

the target first eyebrow geometry comprising:

an upper arc in the first set of curvilinear segments;

an upper arc point intersecting a horizontal tangent of the upper arc;

a lower arc, in the first set of curvilinear segments, extending below the upper arc; and a lower arc point intersecting a horizontal tangent of the lower arc; and further comprising, during projection of the canvas image onto the face of the user during the annotation period:

receiving a first position input from an operator;

relocating the upper arc point, of the target first eyebrow geometry, according to the first position input to align the upper arc point in the canvas image to a peak of an upper edge of a preferred eyebrow of the user;

receiving a second position input from the operator; and relocating the lower arc point, of the target first eyebrow geometry, according to the second position input to align the lower arc point in the canvas image to a peak of a lower edge of the preferred eyebrow of the user.

10. The method of claim 1, further comprising, during projection of the canvas image onto the face of the user during the annotation period:

aligning the vertical face centerline, of the canvas image, to the face of the user;

locating curvilinear segments, in the first set of curvilinear segments of the canvas image, relative to features of the first eyebrow of the user identified as a preferred eyebrow of the user; and mirroring curvilinear segments, in the second set of curvilinear segments of the canvas image, across the vertical face centerline to define the target second eyebrow geometry offset from the first eyebrow of the user.

11. The method of claim 1, further comprising:
in response to receiving confirmation of the target first eyebrow geometry and the target second eyebrow geometry, in the canvas image projected onto the face of the user:
projecting a set of alignment markers, adjacent the canvas image, onto the face of the user.

12. The method of claim 1, further comprising, during projection of the canvas image onto the face of the user during the annotation period:
in response to receiving a symmetry deactivation input from an operator:
disabling symmetry of the first set of curvilinear segments and the second set of curvilinear segments across the vertical face centerline; and
relocating the second set of curvilinear segments of the target second eyebrow geometry, projected onto the face of the user and asymmetric from the first set of curvilinear segments, across the vertical face centerline and according to a position input entered by the operator.

13. The method of claim 1:
further comprising, during the annotation period:
accessing an image captured by an optical sensor facing the user;
detecting a first set of eyebrow hair clusters within a real boundary of the first eyebrow detected in the image;
for each eyebrow hair cluster in the first set of eyebrow hair clusters:
generating a representative vector for the eyebrow hair cluster based on features of hairs in the eyebrow hair cluster detected in the image; and
locating the representative vector, in a set of representative vectors, within the real boundary of the first eyebrow according to a representative root origin of hairs in the eyebrow hair cluster detected in the image;
extrapolating a set of virtual vectors, from the set of representative vectors, within the target first eyebrow geometry and outside of the real boundary of the first eyebrow; and
populating the target first eyebrow geometry in the canvas image with the set of virtual vectors; and
wherein projecting the canvas image onto the face of the user comprises:
projecting the target first eyebrow geometry onto the face of the user; and
projecting the set of virtual vectors, within the target first eyebrow geometry and outside of the real boundary of the first eyebrow of the user, onto the face of the user.

14. The method of claim 13, further comprising, in response to receiving a position input from an operator:
modifying a position of the target first eyebrow geometry in the canvas image, relative to the real boundary of the first eyebrow of the user, according to the position input;
based on modification of the position of the target first eyebrow geometry relative to the real boundary of the first eyebrow, extrapolating a second set of virtual vectors, from the set of representative vectors, within the target first eyebrow geometry and outside of the real boundary of the first eyebrow;
replacing the set of virtual vectors in the target first eyebrow geometry in the canvas image with the second set of virtual vectors; and
projecting the second set of virtual vectors onto the face of the user, within the target first eyebrow geometry, and outside of the real boundary of the first eyebrow of the user.

15. The method of claim 1, further comprising:
projecting a set of eye markers onto the face of the user;
serving a prompt to an operator to align the set of eye markers to eyes of the user;
relocating the set of eye markers, projected onto the face of the user, according to inputs received from the operator to align the set of eye markers to eyes of the user; and
muting elements in the canvas image, projected onto the face of the user, intersecting the set of eye markers.

16. A method comprising:
accessing a canvas image comprising:
a target first eyebrow geometry:
arranged on a first side of a vertical face centerline; and
comprising a first set of curvilinear segments geometrically referenced to a set of facial landmarks; and
a target second eyebrow geometry:
arranged on a second side of the vertical face centerline opposite the target first eyebrow geometry; and
comprising a second set of curvilinear segments geometrically referenced to the set of facial landmarks; and
during an annotation period:
generating a three-dimensional facial representation of a face of a user based on a set of images captured via a set of optical sensors facing the user;
detecting a first set of facial landmarks in the three-dimensional facial representation; and
via a projection system, projecting the canvas image onto a face of a user by automatically aligning the canvas image, projected onto the face of the user, to the first set of facial landmarks.

17. The method of claim 16, further comprising:
in response to receiving confirmation of the target first eyebrow geometry and the target second eyebrow geometry, in the canvas image projected onto the face of the user:
projecting a set of alignment markers, adjacent the canvas image, onto the face of the user; and
serving a prompt to an operator to temporarily apply a set of marks coincident the set of alignment markers on the face of the user.

18. The method of claim 16, further comprising, at a mobile device accessed by the user and prior to the annotation period:
accessing an image of the face of the user captured by the mobile device;
projecting the canvas image onto the image;
rendering the image, annotated with the canvas image, on a display of the mobile device;
adjusting the target first eyebrow geometry and the target second eyebrow geometry according to a sequence of inputs entered by the user; and in response to confirmation of the target first eyebrow geometry and the target second eyebrow geometry from the user:
storing the canvas image in an electronic profile associated with the user.

19. The method of claim 18:

further comprising, at the mobile device and prior to the annotation period:
- detecting a first set of eyebrow hair clusters within a real boundary of a first eyebrow detected in the image;
- for each eyebrow hair cluster in the first set of eyebrow hair clusters:
  - generating a representative vector for the eyebrow hair cluster based on features of hairs in the eyebrow hair cluster detected in the image; and
  - locating the representative vector, in a set of representative vectors, within the real boundary of the first eyebrow according to a representative root origin of hairs in the eyebrow hair cluster detected in the image;
- extrapolating a set of virtual vectors, from the set of representative vectors, within the target first eyebrow geometry and outside of the real boundary of the first eyebrow; and
- populating the target first eyebrow geometry in the canvas image with the set of virtual vectors; and wherein projecting the canvas image onto the face of the user comprises:
- projecting the target first eyebrow geometry onto the face of the user; and
- projecting the set of virtual vectors, within the target first eyebrow geometry and outside of the real boundary of the first eyebrow of the user, onto the face of the user.

20. A method comprising:

accessing a canvas image comprising:
- a target first eyebrow geometry of a first eyebrow of a user, the target first eyebrow geometry comprising a first set of curvilinear segments; and
- a target second eyebrow geometry of a second eyebrow of the user, the target second eyebrow geometry comprising a second set of curvilinear segments; and during an annotation period:
- via a projection system, projecting the canvas image onto a face of a user to:
  - locate curvilinear segments, in the first set of curvilinear segments of the target first eyebrow geometry in the canvas image projected onto the face of the user, relative to features of the first eyebrow of the user; and
  - locate curvilinear segments, in the second set of curvilinear segments of the target second eyebrow geometry in the canvas image projected onto the face of the user, relative to features of the second eyebrow of the user.

* * * * *